Patented Mar. 27, 1934

1,952,622

UNITED STATES PATENT OFFICE 1,952,622

PROCESS OF NEUTRALIZATION

Lyle Caldwell, Long Beach, Calif., assignor, by mesne assignments, to California First National Bank of Long Beach, Long Beach, Calif., a national banking association, as trustee No Drawing. Application September 9, 1930, Serial No. 480,807

4 Claims. (Cl. 196—41)

This invention relates to an improved method for the neutralization of acid treated oils and has for its principal object the more efficient contacting of such oils with a solid neutralizing agent whereby bonding of the neutralizing agent is prevented and the flow rate therethrough may be maintained.

In my copending application, Serial Number 447,275, filed April 25, 1930, of which this application is a continuation in part, there is described and claimed a process wherein a stream of acid treated hydrocarbon, or other oil is percolated upwardly through a column containing a granular water insoluble neutralizing material which has the characteristic of forming water soluble reaction compounds with the inorganic, or organic, acid constituents of the oil when in the presence of water.

In this manner the reactive surfaces of the neutralizing agent are gradually reduced by the formation of water soluble salts, which may later be removed by washing with water after the stream of acid oil has been diverted therefrom to give a fresh surface for contacting with the acid oil again.

The solid neutralizing agents used may be brucite, a native mineral, ($MgO.H_2O$); magnesite ($MgCO_3$); hydro-magnesite ($MgCO_3.3H_2O$); dead burned magnesite ($MgO$); caustic calcined magnesite ($MgO$); calamine ($H_2Zn_2SiO_5$); rhodochrosite ($MnCO_3$) or their equivalents, of which the brucite and caustic calcined magnesite give the highest neutralizing values.

However, in the use of such materials, it is found that where the neutralizing agent is crushed finer than 12 mesh and coarser than 20 mesh the contacting surfaces between the particles are spaced too far apart, so that when insufficient moisture is present to form the desired water soluble salts there is a tendency for the particles to coalesce, or bond, into a fairly dense mass which prevents efficient percolating and cuts down the flow rate.

It is therefore, an object of this invention to maintain the spaces between the particles of granular neutralizing agent in a relatively open condition so that the mass remains porous to maintain a given flow rate while maintaining the greatest possible contact area. This is accomplished by mixing with the crushed neutralizing agent, a substantially water insoluble granular material which is acid resistant, has great strength, and is not greatly affected by the small amount of abrasion incident to the process. Such materials may include silica ($SiO_2$) in the amorphous forms of tripoli, diatomaceous earth, opaline silica, etc., or the crystalline forms of quartz, sand, etc.

The spacing material may be crushed, or disintegrated, to pass any desired mesh and is intimately mixed with the crushed neutralizing agent before moistening with water and then passing the acid oil therethrough to be neutralized.

The passage of acid oil through a column of crushed neutralizing agent, such as brucite, whether mixed with the spacing material as described or not, neutralizes the acid constituents of the oil to form water soluble compounds which are thereafter removed by washing the material with water. Such flowing causes slight abrasion of the material to the end that, while the brucite is substantially insoluble in water, the degree of its solubility is sufficient to give the wash water a recognizable alkaline reaction which, while the alkalinity is infinitely small on a pH scale, is sufficient to eliminate any erosion of transfer pipes, sewers, etc., which takes place normally in the carrying of acid reaction products from other processes. This feature is of great importance in oil refineries and other industrial institutions.

The extended use of the column of neutralizing agent alone, with subsequent water washing, gradually reduces the particle size of the neutralizing agent so that the porosity of the percolating bed gradually decreases, but by mixing therewith a sized spacing material, as described, which does not change in particle size, the effect of any decrease in size of the neutralizing agent is minimized while the flow rate is very little affected.

I claim as my invention:

1. A process of treating oil which comprises: flowing hydrocarbon oil containing acid compounds through a mass of material wet by water, said mass consisting of a mineral containing MgO capable of reacting with said acid compounds in the presence of the water to form water soluble reaction products and a water insoluble mineral containing $SiO_2$ incapable of reacting with said acid compounds, continuing such flow until the reactive mineral is reduced in reactivity, then removing the water soluble products by washing the material with water.

2. A process of treating oil which comprises: flowing hydrocarbon oil containing acid compounds through a mass of material wet by water, said mass consisting of a slightly water soluble mineral containing MgO capable of reacting with said acid compounds in the presence of the water to form water soluble reaction products and a water insoluble mineral containing $SiO_2$ incapable of reacting with said acid compounds, continuing such flow until the reactive mineral is reduced in reactivity, then removing the water soluble products by washing the material with water.

3. A process of treating oil which comprises: flowing hydrocarbon oil containing acid compounds through a mass of material wet by water, said mass consisting of magnesium hydroxide mineral capable of reacting with said acid compounds in the presence of the water to form water soluble reaction products and a water insoluble silica incapable of reacting with said acid compounds, continuing such flow until the reactive mineral is reduced in reactivity, then removing the water soluble products by washing the material with water.

4. A process of treating oil which comprises: flowing hydrocarbon oil containing acid compounds through a mass of granulated mineral containing MgO wet by water and capable of reacting with said acid compounds in the presence of the water to form water soluble reaction products, maintaining the rate of flow by the incorporation in said mass of a water insoluble granulated mineral containing $SiO_2$ incapable of reacting with said acid compounds, and removing the water soluble products formed by washing the mass with water.

LYLE CALDWELL.